(12) United States Patent
Majerowski et al.

(10) Patent No.: US 6,553,712 B1
(45) Date of Patent: Apr. 29, 2003

(54) INSECTICIDAL LIQUID BAIT STATION

(75) Inventors: Amelia H. Majerowski, Kenosha, WI (US); Brian T. Davis, Burlington, WI (US); Thomas Jaworski, Racine, WI (US); Jonathan N. Mandell, Gurnee, IL (US); Mary Beth Adams, Gurnee, IL (US); James W. Yonker, Racine, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 10/069,153

(22) PCT Filed: Jun. 30, 2000

(86) PCT No.: PCT/US00/18091

§ 371 (c)(1),
(2), (4) Date: Feb. 21, 2002

(87) PCT Pub. No.: WO01/01770

PCT Pub. Date: Jan. 11, 2001

Related U.S. Application Data

(60) Provisional application No. 60/142,184, filed on Jul. 1, 1999.

(51) Int. Cl.[7] .............................................. A01M 1/20
(52) U.S. Cl. ........................... 43/131; 43/132.1; 239/44
(58) Field of Search ................................ 43/131, 132.1; 239/43, 44, 46, 51

(56) References Cited

U.S. PATENT DOCUMENTS

| | | | |
|---|---|---|---|
| 1,309,606 A | 7/1919 | Bartholomew | |
| 2,167,978 A | 8/1939 | Jennerich | 43/121 |
| 3,587,968 A | * 6/1971 | Hennart et al. | 239/309 |
| 3,727,840 A | 4/1973 | Nigro | 239/43 |
| 4,247,042 A | 1/1981 | Schimanski et al. | 239/43 |
| 4,323,193 A | * 4/1982 | Compton et al. | 239/44 |
| 4,526,320 A | 7/1985 | von Philipp et al. | 239/43 |
| 4,630,775 A | * 12/1986 | Mandon et al. | 239/56 |
| 4,823,506 A | 4/1989 | Demarest et al. | 43/131 |
| 4,837,969 A | 6/1989 | Demarest | 43/131 |
| 5,033,229 A | 7/1991 | Demarest et al. | 43/131 |
| 5,038,516 A | 8/1991 | Doucette | 43/131 |
| 5,339,563 A | 8/1994 | Job | 43/122 |
| 5,501,033 A | 3/1996 | Wefler | 43/131 |
| 5,548,922 A | 8/1996 | Wefler | 43/131 |
| 5,628,143 A | 5/1997 | Doucette | 43/124 |
| 5,749,168 A | 5/1998 | Chrysanthis | 43/122 |
| 5,802,761 A | 9/1998 | Demarest et al. | 43/131 |
| 5,839,221 A | * 11/1998 | Ron et al. | 239/43 |
| 5,857,286 A | 1/1999 | Doucette | 43/131 |
| 5,875,968 A | 3/1999 | Miller et al. | 239/44 |
| 5,960,585 A | 10/1999 | Demarest et al. | 43/131 |

FOREIGN PATENT DOCUMENTS

WO     WO 94/22297     10/1994

* cited by examiner

*Primary Examiner*—Charles T. Jordan
*Assistant Examiner*—Tara M. Golba

(57) ABSTRACT

An insect bait station is disclosed. The insect bait station includes: a reservoir for holding a liquid bait, the reservoir having a mouth and a closure for sealing the mouth such that the liquid bait is contained in the reservoir; a piercer for opening the closure of the reservoir such that a liquid wicking device positioned in the mouth of the reservoir may transport the liquid bait from the reservoir and through the mouth of the reservoir; and an activation member for moving the piercer into contact with the closure of the reservoir to open the closure, wherein the insect bait station also comprises an insecticide.

8 Claims, 11 Drawing Sheets

INSECTICIDAL LIQUID BAIT STATION

CROSS REFERENCES TO RELATED APPLICATIONS

This application claims priority from United States Provisional Patent Application No. 60/142,184, filed Jul. 1, 1999.

BACKGROUND OF THE INVENTION

The present invention relates to insecticidal bait stations for the control of insects such as cockroaches.

Many devices for holding a poisonous bait to control crawling insects are known, ranging from simple cardboard tubes open at both ends with the bait glued inside, to more elaborate structures that have a centrally enclosed bait accessible by peripheral openings. Some of these insect control devices are configured to hold a solid bait/toxicant preparation. "Solid" in this context means non-pourable and includes pastes, gels, firm solids, and the like. For example, U.S. Pat. No. 4,837,969 shows an insect bait station suitable for holding a solid bait.

Other insect control devices are configured to deliver a liquid bait/toxicant preparation. For example, U.S. Pat. No. 5,033,229 discloses a bait station for passive control of insects, particularly roaches, that provides a source of a liquid bait-toxicant solution, which roaches seek, and U.S. Pat. No. 5,501,033 discloses techniques for the controlled delivery of a liquid insecticidal bait along a vertical axis.

Insect control devices configured to hold both a liquid and a solid bait and/or toxicant preparation are also known. For instance, U.S. Pat. No. 2,167,978 discloses an insect control device having a paralyzing insect powder as well as a liquid aitractant (water) wicked upwardly to a desired position from a reservoir; U.S. Pat. No. 5,339,563 discloses the use of a liquid positioned adjacent an insecticidal material; and U.S. Pat. No. 5,749,168 discloses an insect control device having liquid and solid bait.

In document U.S. Pat. No. 5,749,168 mentioned above and on which the pre-characterized part of claim 1 is based, the liquid is a trapping solution, preferably comprising a mixture of water and household glue.

Insect bait stations that offer a solid poisonous meal and a poisonous drink are quite advantageous, as crawling insects will be able to consume both solid and liquid poisonous materials when looking for water or similar liquids. However, currently available insect control devices that include solid and liquid bait do not provide for a convenient means for sealing the liquid bait during transport and storage and for releasing the liquid bait when the insect bait station is placed into service.

Documents U.S. Pat. Nos. 4,247,042, 4,526,320, 3,727,840 and 5,875,968 disclose vaporizers in which a liquid, for example an insecticide solution or a deodorizing liquid, is contained in a reservoir having a readily breakable closure. The closure is pierced when the device is first activated allowing the volatile liquid to escape.

Despite the existence of this prior art, there is a need for a bait station that provides a convenient means for safely containing the liquid bait during transport and storage, for activating the liquid bait component when the insect bait station is placed into service, and for optionally retaining a solid bait as well.

SUMMARY OF THE INVENTION

The foregoing needs are satisfied by an insect bait station and defined in the appended claims. Such a station has a reservoir for holding a liquid bait, the reservoir having a mouth and a closure for sealing the mouth such that the liquid bait is contained in the reservoir; a piercer for opening the closure of the reservoir such that a liquid wicking device positioned in the mouth of the reservoir may transport the liquid bait from the reservoir and through the mouth of the reservoir; and an activation member for moving the piercer into contact with the closure of the reservoir to open the closure, wherein the station also comprises an insecticide and a solid bait.

BRIEF DESCRIPTION OF THE DRAWINGS

The features, aspects, and advantages of the present invention will become better understood upon consideration of the following detailed description, appended claims and accompanying drawings where:

Figure 1:
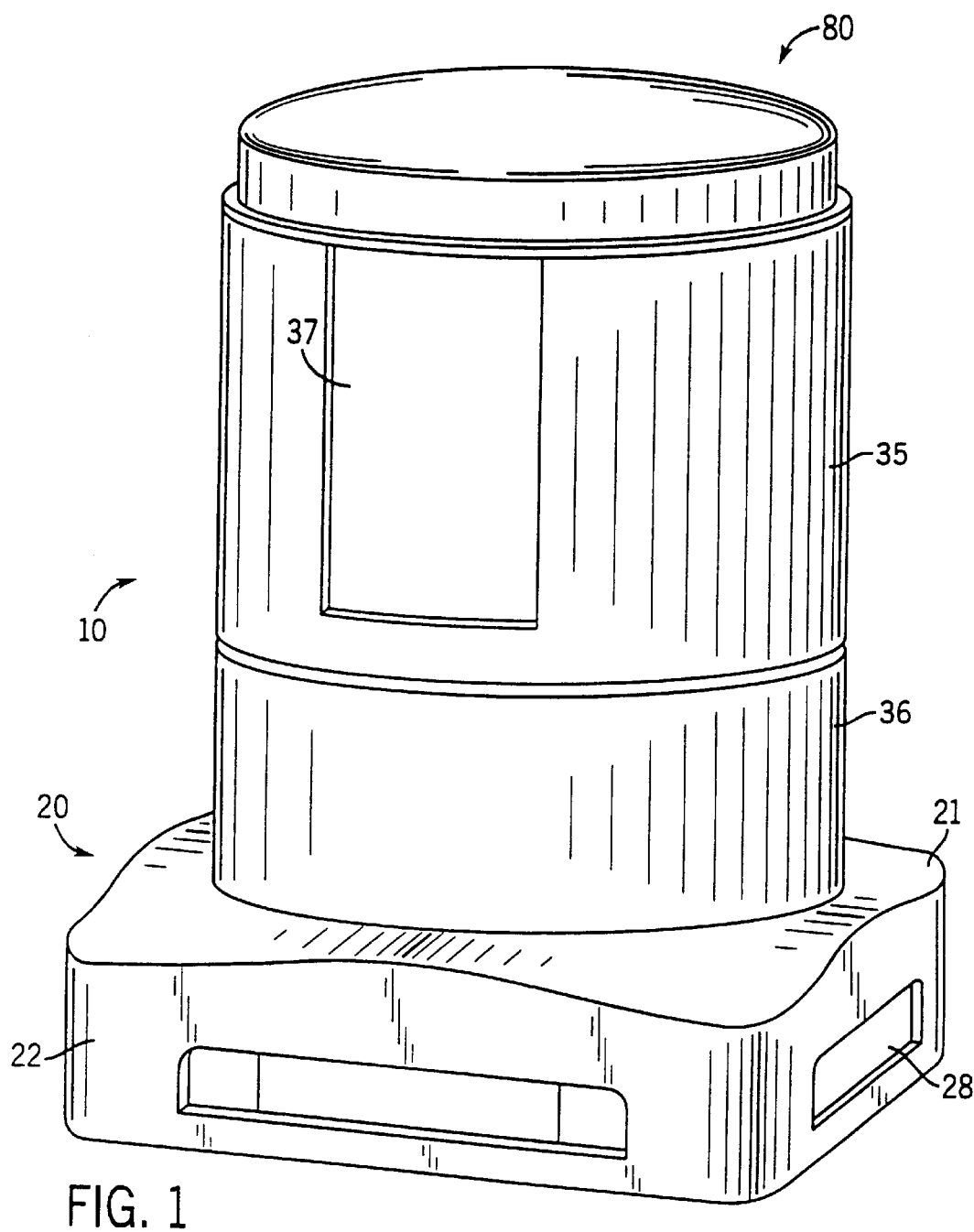
FIG. 1 is a perspective view of an insect bait station in accordance with the invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DETAILED DESCRIPTION OF THE INVENTION

Figure 2:
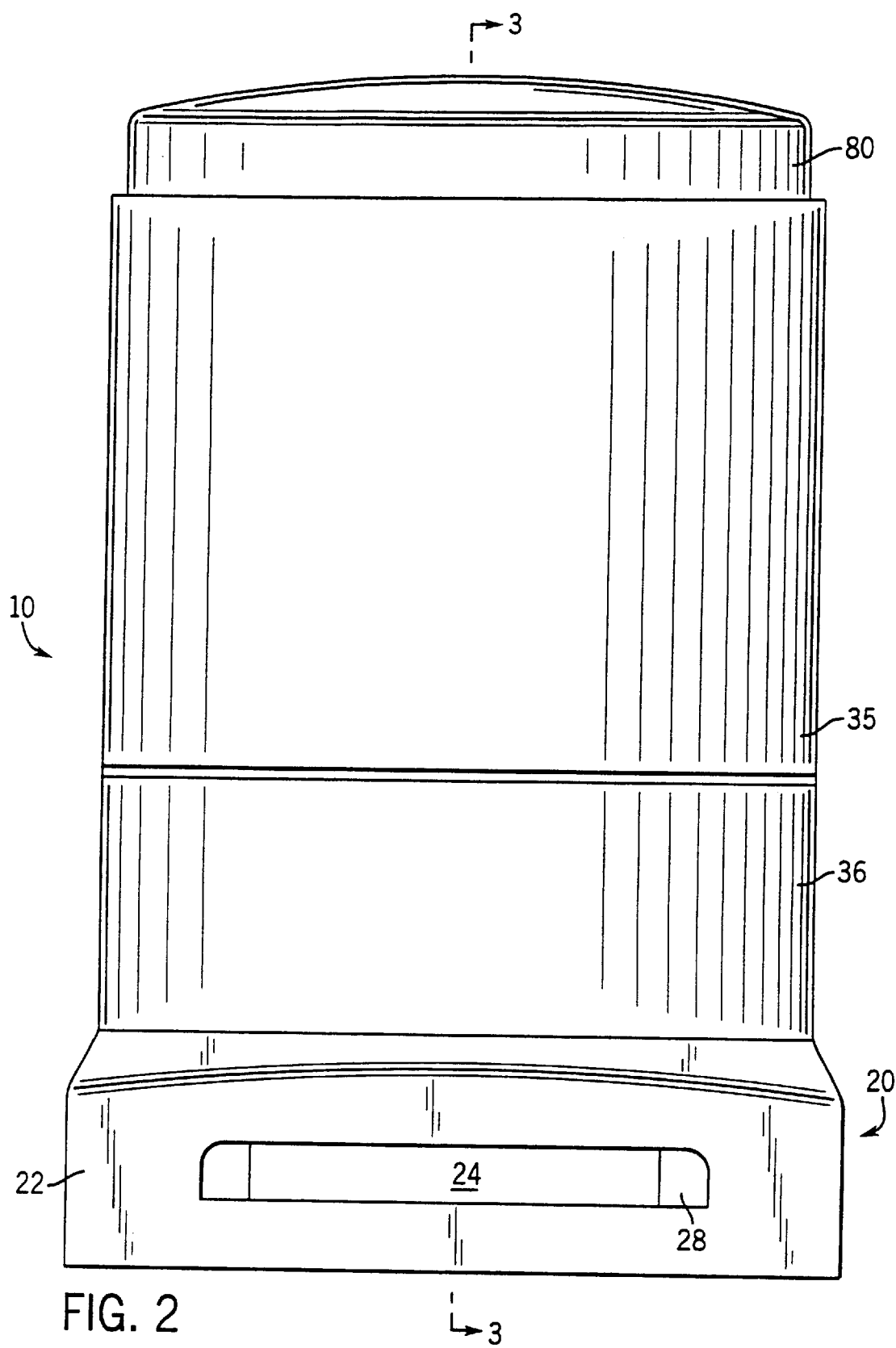
FIG. 2 is a side elevational view of the insect bait station of FIG. 1.

Referring now to FIGS. 1 and 2, there is shown an embodiment of an insect bait station in accordance with the invention. The insect bait station 10 includes a base 20 having an outer wall 22, a slightly inclined portion 21 extending inwardly from the outer wall 22, and a cylindrical wall 36 extending upwardly from the inclined portion 21. The outer wall 22 of the base 20 has an opening 28 that provides access into the insect bait station 10. The insect bait station 10 also includes a cylindrical wall portion 35 affixed to the top of the cylindrical wall 36 of the base 20. The cylindrical wall portion 35 may include a transparent window 37 that enables a user to view inside the insect bait station 10. The insect bait station 10 also includes an activation member 80 that may be press fit into an upper portion of the cylindrical wall portion 35. The activation member 80 and the cylindrical wall portion 35 are dimensioned such that the activation member may be moved downward in relation to the cylindrical wall portion 35 by applying pressure to a top surface of the activation member 80. Preferably, the components of the insect bait station are manufactured from a polymeric material such as polyethylene or polypropylene.

Figure 3A:
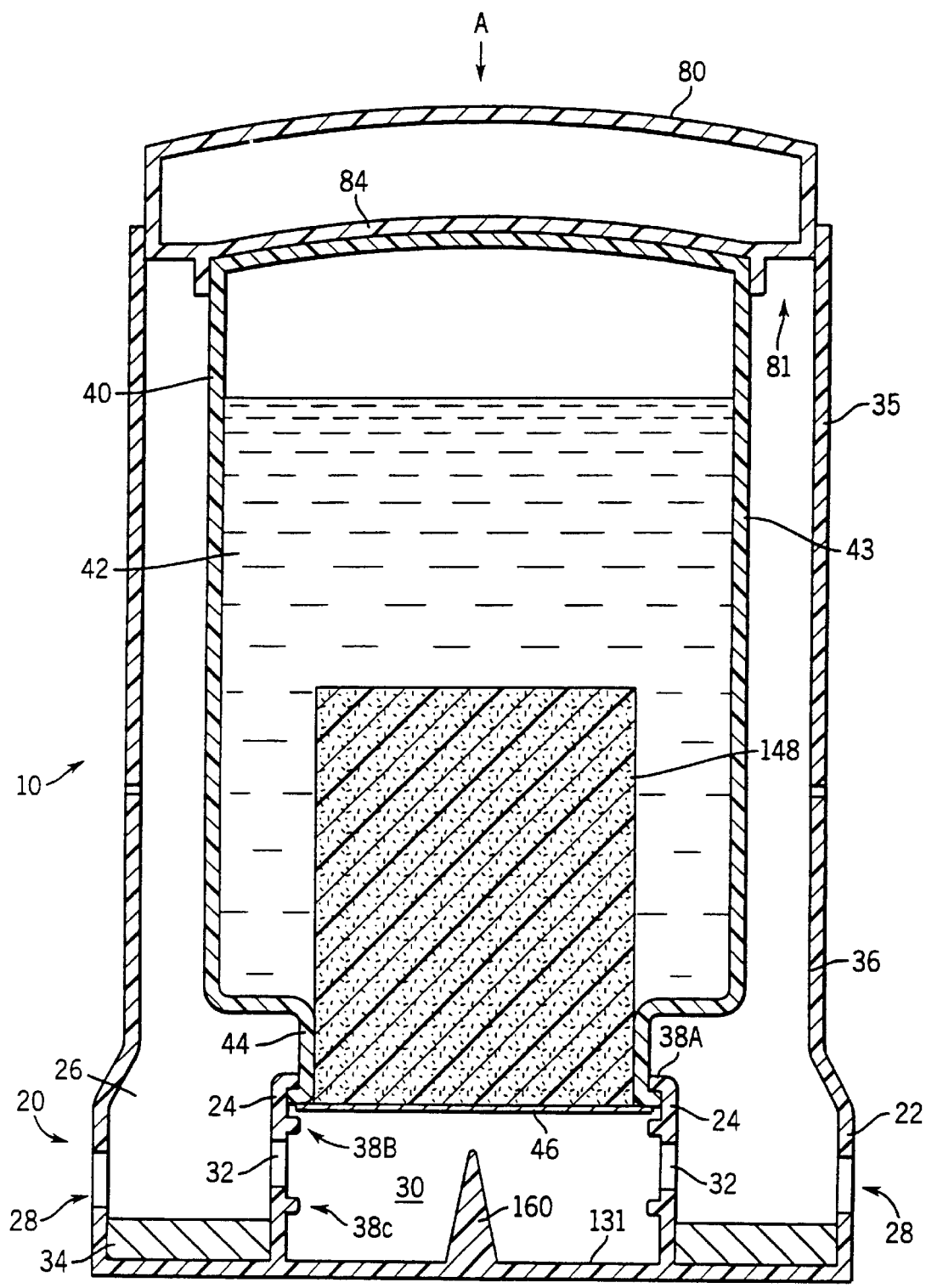
FIG. 3A is a cross sectional view of the insect bait station of FIG. 2 taken along line 3—3, showing the insect bait station before activation of the liquid bait.
Figure 3B:
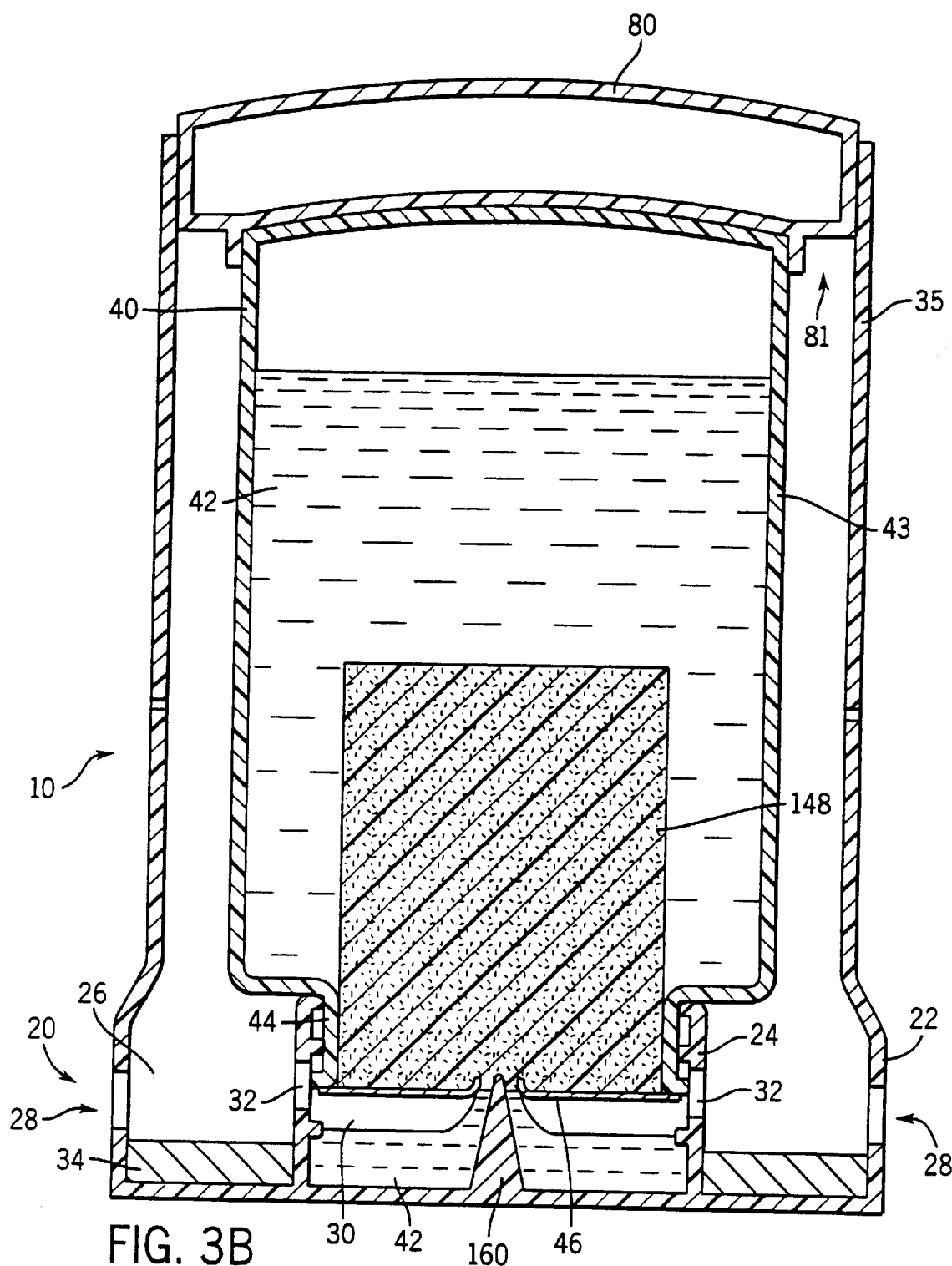
FIG. 3B is a cross sectional view of the insect bait station of FIG. 2 taken along line 3—3, showing the insect bait station immediately after activation of the liquid bait.

Referring now to FIGS. 3A and 3B, the inside of the insect bait station 10 of FIGS. 1 and 2 is shown in detail. The base 20 includes a cylindrical inner wall 24 that is inwardly spaced from the outer wall 22 so as to define a solid bait chamber 26 between the outer wall 22 and the inner wall 24. The solid bait chamber 26 contains a solid bait 34. The solid bait 34 may be any of a number of solid bait-toxicant formulations, preferably one having a delayed kill action. An example of a suitable solid bait-toxicant comprises: boric acid (@ 2% by weight), sugar/corn Sweetener (@ 15% by weight), preservative such as that commonly sold under the trademark "Legend MK" (@ 0.2% by weight), carageenan (@ 1.2% by weight) and water (@ 81.6% by weight). The inner wall 24 of the base 20 also defines a liquid bait holding tank 30 in an inner region of the base 20. The liquid bait holding tank 30 has a floor 131 and a conical piercer 160 that extends upwardly from the floor 131.

The insect bait station 10 shown in FIGS. 3A and 3B also includes a reservoir 40 for holding a liquid bait 42. The liquid bait 42 may be an aqueous bait-toxicant formulation, preferably one having a delayed kill action. An example of a suitable bait-toxicant formulation would comprise 9.5% chlorpyrifos insecticide, 5.0% isoparrafinic hydrocarbon (BP 208°–289° C.), 1.0% HLB-12 emulsifier, 10.0% sucrose, and 83.5% water. Another example formula is: boric acid (@ 2% by weight), sugar/corn Sweetener (@15% by weight), preservative such as that commonly sold under the trademark "Legend MK" by Rohm & Haas (@ 0.2% by weight) and water (@ 82.8% by weight). Other aqueous formulations containing insecticides and bait components may also be used.

The reservoir 40 may be made from a plastic material, and has a body 43 that terminates in a mouth 44. The mouth 44 is sealed so as to contain the liquid bait 42 in the reservoir 40 by way of a closure 46. The closure 46 may be any material suitable for sealing the mouth 44 of the reservoir 40. However, the closure material must be capable of being punctured by the piercer 160 as will be described below. One suitable material for the closure 46 is a foil material commonly used as a safety seal on pharmaceutical containers. The reservoir 40 is arranged in the insect bait station 10 in an inverted position as shown in FIGS. 3A and 3B. One end of the reservoir 40 is arranged in abutting relationship with an underside 84 of the activation member 80 between spaced apart mounting tabs 81. The mouth 44 of the reservoir 40 fits snugly against an inner surface of the cylindrical inner wall 24. The mouth 44 of the reservoir 40 is positioned between inwardly directed protrusions 38a and 38b on the inner surface of the inner wall 24 in order to maintain the sealed reservoir 40 in a 30 storage position as shown in FIG. 3A.

The reservoir 40 also includes a liquid transport device 148 positioned in the mouth 44 of the reservoir 40. The liquid transport device 148 may be a member having capillary channels for transferring liquid by capillary action or may be a body formed from a porous wicking material such as a fiber wick. Many materials are suitable for wicking liquid through a body of material. For example, fibrous or porous polymeric materials will wick liquid. Sponges with small pores, capillaries, and lattice matrices of cellulosic materials or polymers all can draw liquid to a surface. In the present invention, cellulosic, polyolefinic (e.g., polyethylene and polypropylene), and ceramic materials are preferred for the wicking material.

As noted above, FIG. 3A shows the insect bait station 10 before any liquid bait 42 would be accessible to a crawling insect. The configuration of the insect bait station shown in FIG. 3A prevents any liquid bait 42 from leaking or spilling when the insect bait station 10 is transported before activation by a user. In order to activate the insect bait station 10 so that a liquid bait 42 and a solid bait 34 are accessible to a crawling insect, a user applies a downward force to the activation member 80 in direction "A" as shown in FIG. 3A. When a user applies the downward force in direction "A", the activation member 80 moves the liquid reservoir 40 downward such that the piercer 160 on the floor 131 of the liquid holding tank 30 comes into contact with the closure 46 and punctures the closure such that liquid bait 42 may exit the reservoir 40. The liquid transport device 148 controls the release of liquid bait 42 from the reservoir 40. As shown in FIG. 3B, the liquid bait 42 travels from the body 43 of the reservoir 40 through the liquid transport device 148 and through the mouth 44 of the reservoir 40. The liquid bait 42 then travels down the sloping sides of the piercer 160 and into the liquid holding tank 30. The liquid bait 42 is then accessible to a crawling insect that enters the opening 28 in the outer wall 22 of the base 20 and the aperture 32 in the inner wall 24 of the base 20. While the ability of an insect to access liquid bait 42 in the liquid bait holding tank 30 is readily apparent, insects can also feed directly from the liquid transport device 148. Therefore, the presence of liquid bait 42 in the liquid bait holding tank 30 is not a requirement of the invention as long as an insect can access the liquid transport device 148 to feed.

Figure 4:
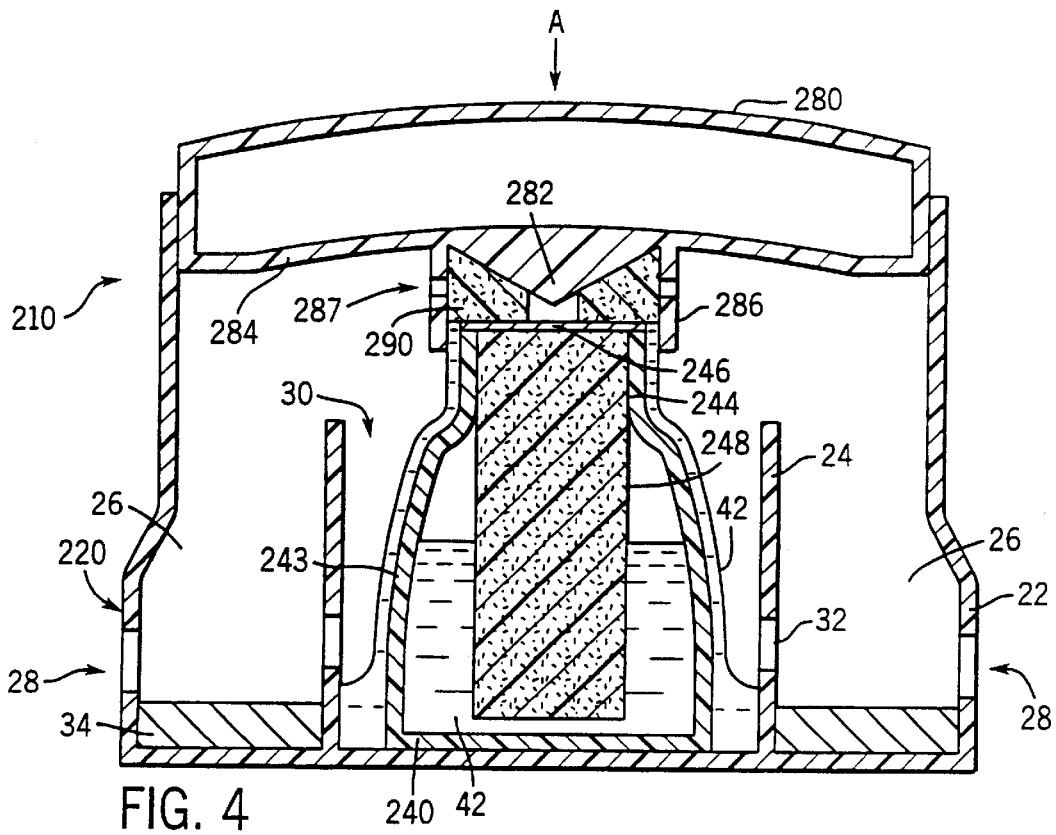
FIG. 4 is a cross sectional view, similar to FIG. 3B, of another embodiment of an insect bait station in accordance with the invention.

Turning now to FIG. 4, the inside of another embodiment of an insect bait station 210 in accordance with the invention is shown. The base 220 includes a cylindrical inner wall 24 that is inwardly spaced from the outer wall 22 so as to define a solid bait chamber 26 between the outer wall 22 and the inner wall 24. The solid bait chamber 26 contains a solid bait 34 as described above. The inner wall 24 of the base 220 also defines a liquid bait holding tank 30 in an inner region of the base 220.

The insect bait station 210 shown in FIG. 4 also includes a reservoir 240 for holding a liquid bait 42. The reservoir 240 has a body 243 with sloping sides that extend upward and terminate in a mouth 244. The mouth 244 is sealed so as to contain the liquid bait 42 in the reservoir 240 by way of a closure 246, preferably a foil material as described above. As shown in FIG. 4, the reservoir 240 is arranged in the insect bait station 210 such that the mouth 244 opens upwardly and the bottom end of the reservoir 240 rests on the floor of the a liquid bait holding tank 30. The reservoir 240 also includes a liquid transport device 248 that may be a capillary member or other porous material such as a wick. The liquid transport device 248 is positioned in the mouth 244 of the reservoir 240.

The insect bait station 210 of FIG. 4 also includes an activation member 280 that is used to release liquid bait 42 from the reservoir 240 into the liquid holding tank 30. The activation member 280 has a conical projection 282 that extends downwardly from an underside 284 of the activation member 280. A liquid transport device 290, such a capillary member or other porous material such as a wick, surrounds the projection 282. A cylindrical wall 286 also extends downwardly from an underside 284 of the activation member 280 and surrounds the liquid transport device 290.

FIG. 4 shows the insect bait station 210 with the activation member 280 in the storage position, i.e., the position that would keep the liquid bait 42 in the reservoir 240. In order to activate the insect bait station 210 so that the liquid bait 42 and the solid bait 34 are both accessible to a crawling insect, a user applies a downward force to the activation member 280 in direction "A" as shown in FIG. 4. When a user applies the downward force in direction "A", the activation member 280 moves downward such that conical projection 282 punctures the closure 246 of the reservoir 240 such that liquid bait 42 may exit the reservoir 240. The liquid transport device 248 transports the liquid bait 42 upward from the body 243 of the reservoir 240 by capillary or wicking action through the mouth 244 of the reservoir 240. The liquid transport device 290, which is in fluid communication with the liquid transport device 248, then transports the liquid bait 42 from the liquid transport device 248 such that the liquid bait 42 travels down the sloping sides of reservoir 240 and into the liquid holding tank 30 as shown in FIG. 4. Liquid bait 42 may also travel through openings 287 of the cylindrical wall 286 of the activation member 280 and down the sloping sides of reservoir 240 and into the liquid holding tank 30. The liquid bait 42 is then accessible to a crawling insect that enters the opening 28 in the outer wall 22 of the base 220 and the aperture 32 in the inner wall 24 of the base 220. While the ability of an insect to access liquid bait 42 in the liquid bait holding tank 30 is readily apparent, insects can also feed directly from the liquid transport device 248 and/or liquid transport device 290. Therefore, the presence of liquid bait 42 in the liquid bait holding tank 30 is not a requirement of the invention as long as an insect can access the liquid transport device 248 and/or liquid transport device 290 to feed.

Figure 5:
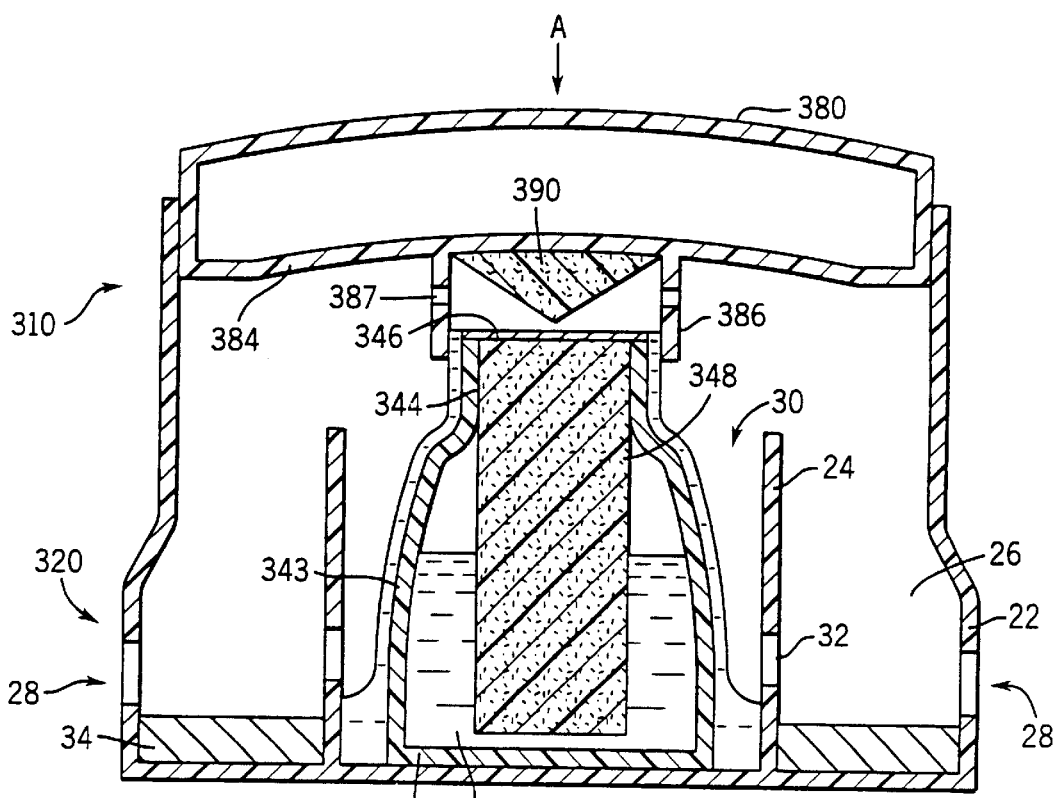
FIG. 5 is a cross sectional view, similar to FIG. 3B, of yet another embodiment of an insect bait station in accordance with the invention.

Referring now to FIG. 5, the inside of yet another embodiment of an insect bait station 310 in accordance with the invention is shown. The base 320 includes a cylindrical inner wall 24 that is inwardly spaced from the outer wall 22 so as to define a solid bait chamber 26 between the outer wall 22 and the inner wall 24. The solid bait chamber 26 contains a solid bait 34 as described above. The inner wall 24 of the base 320 also defines a liquid bait holding tank 30 in an inner region of the base 320.

The insect bait station 310 shown in FIG. 5 also includes a reservoir 340 for holding a liquid bait 42. The reservoir 340 has a body 343 with sloping sides that extend upward and terminate in a mouth 344. The mouth 344 is sealed so as to contain the liquid bait 42 in the reservoir 340 by way of a closure 346, preferably a foil material as described above. As shown in FIG. 5, the reservoir 340 is arranged in the insect bait station 310 such that the mouth 344 opens upwardly and the bottom end of the reservoir 340 rests on the floor of the a liquid bait holding tank 30. The reservoir 340 also includes a liquid transport device 348 that may be a capillary member or other porous material such as a wick. The liquid transport device 348 is positioned in the mouth 344 of the reservoir 340.

The insect bait station 310 of FIG. 5 also includes an activation member 380 that is used to release liquid bait 42 from the reservoir 340 into the liquid holding tank 30. The activation member 380 has a liquid transport device 390, such a capillary member or other porous material such as a wick, that extends downwardly from an underside 384 of the activation member 380. A cylindrical wall 386 also extends downwardly from an underside 384 of the activation member 380 and surrounds the liquid transport device 390.

FIG. 5 shows the insect bait station 310 with the activation member 380 in the storage position, i.e., the position that would keep the liquid bait 42 in the reservoir 340. In order to activate the insect bait station 310 so that the liquid bait 42 and the solid bait 34 are both accessible to a crawling insect, a user applies a downward force to the activation member 380 in direction "A" as shown in FIG. 5. When a user applies the downward force in direction "A", the activation member 380 moves downward such that liquid transport device 390 punctures the closure 346 of the reservoir 340 such that liquid bait 42 may exit the reservoir 340. The liquid transport device 348 transports the liquid bait 42 upward from the body 343 of the reservoir 340 by capillary or wicking action through the mouth 344 of the reservoir 340. The liquid transport device 390, which is in fluid communication with the liquid transport device 348, then transports the liquid bait 42 from the liquid transport device 348 such that the liquid bait 42 travels down the sloping sides of reservoir 340 and into the liquid holding tank 30 as shown in FIG. 5. Liquid bait 42 may also travel through openings 387 of the cylindrical wall 386 of the activation member 380 and down the sloping sides of reservoir 340 and into the liquid holding tank 30. The liquid bait 42 is then accessible to a crawling insect that enters the opening 28 in the outer wall 22 of the base 320 and the aperture 32 in the inner wall 24 of the base 320. While the ability of an insect to access liquid bait 42 in the liquid bait holding tank 30 is readily apparent, insects can also feed directly from the liquid transport device 348 and/or liquid transport device 390. Therefore, the presence of liquid bait 42 in the liquid bait holding tank 30 is not a requirement of the invention as long as an insect can access the liquid transport device 348 and/or liquid transport device 390 to feed.

Figure 6:
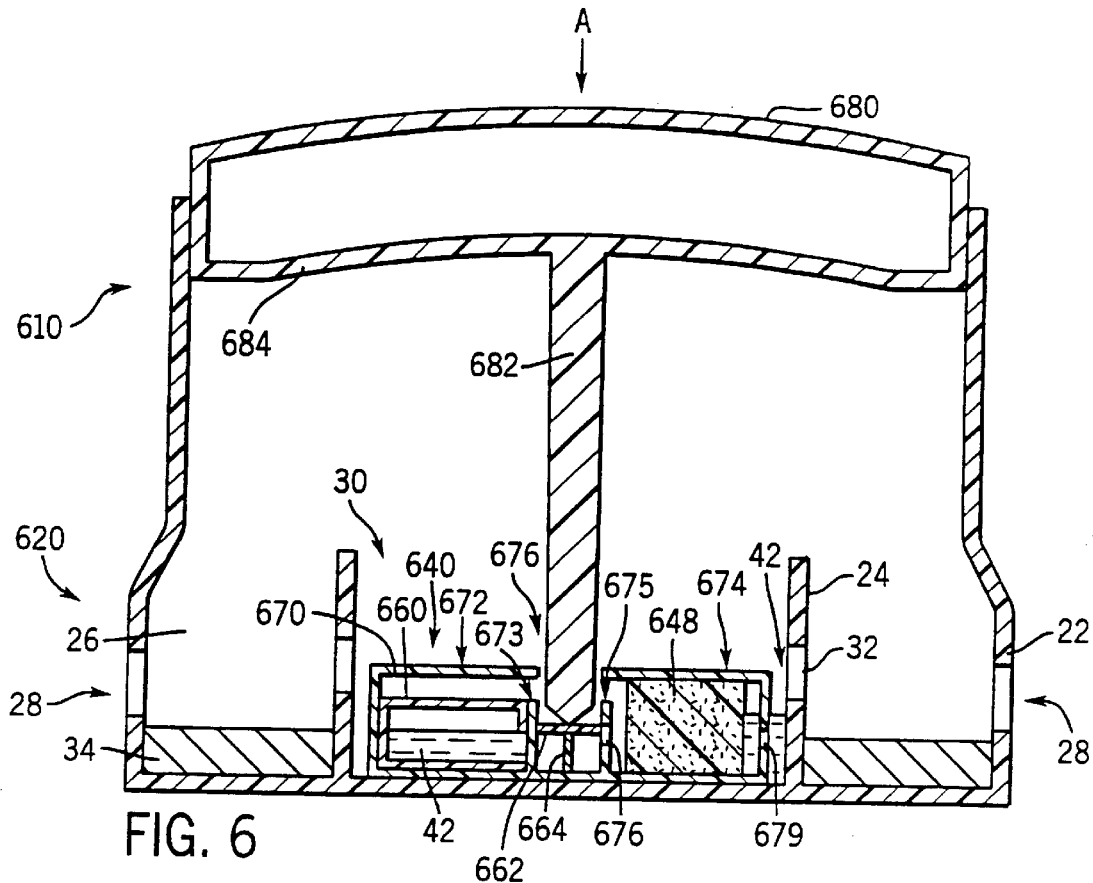
FIG. 6 is a cross sectional view, similar to FIG. 3B, of still another embodiment of an insect bait station in accordance with the invention.

Turning now to FIG. 6, the inside of another embodiment of an insect bait station 610 in accordance with the invention is shown. The base 620 includes a cylindrical inner wall 24 that is inwardly spaced from the outer wall 22 so as to define a solid bait chamber 26 between the outer wall 22 and the inner wall 24. The solid bait chamber 26 contains a solid bait 34 as described above. The inner wall 24 of the base 620 also defines a liquid bait holding tank 30 in an inner region of the base 620.

The insect bait station 610 of FIG. 6 also includes an activation member 680 that is used to release liquid bait 42 from the reservoir 640 into the liquid holding tank 30. The activation member 680 has a blade 682 that extends downwardly from an underside 684 of the activation member 680. FIG. 6 shows the insect bait station 610 with the activation member 680 in the storage position, i.e., the position that would keep the liquid bait 42 in the reservoir 640. In order to activate the insect bait station 610 so that the liquid bait 42 and the solid bait 34 are both accessible to a crawling insect, a user applies a downward force to the activation member 680 in direction "A" as shown in FIG. 6. When a user applies the downward force in direction "A", the activation member 680 moves downward such that the edge of the blade 682 opens the cap 662 of the bottle 660 by fracturing the area of reduced thickness 664 of the cap 662 such that liquid bait 42 may exit the bottle 660. The liquid bait 42 passes through the aperture 676 in the second wall 675 of the housing 670 and contacts the liquid transport device 648. The liquid transport device 648 transports the liquid bait 42 by capillary or wicking action through an opening 679 in an end of the housing 670 and into the liquid bait holding tank 30. The liquid bait 42 is then accessible to a crawling insect that enters the opening 28 in the outer wall 22 of the base 620 and the aperture 32 in the inner wall 24 of the base 620. While the ability of an insect to access liquid bait 42 in the liquid bait holding tank 30 is readily apparent, insects can also feed directly from the liquid transport device 648. Therefore, the presence of liquid bait 42 in the liquid bait holding tank 30 is not a requirement of the invention as long as an insect can access the liquid transport device 648 to feed.

The insect bait station 610 of FIG. 6 also includes an activation member 680 that is used to release liquid bait 42 from the reservoir 640 into the liquid holding tank 30. The activation member 680 has a blade 682 that extends downwardly from an underside 684 of the activation member 680. FIG. 6 shows the insect bait station 610 with the activation member 680 in the storage position, i.e., the position that would keep the liquid bait 42 in the reservoir 640. In order to activate the insect bait station 610 so that the liquid bait 42 and the solid bait 34 are both accessible to a crawling insect, a user applies a downward force to the activation member 680 in direction "A" as shown in FIG. 6. When a user applies the downward force in direction "A", the activation member 680 moves downward such that the edge of the blade 682 opens the cap 662 of the bottle 660 by fracturing the area of reduced thickness 664 of the cap 662 such that liquid bait 42 may exit the bottle 660. The liquid bait 42 passes through the aperture 676 in the second wall 675 of the housing 670 and contacts the liquid transport device 648. The liquid transport device 648 transports the liquid bait 42 by capillary or wicking action through an opening 679 in an end of the housing 670 and into the liquid bait holding tank 30. The liquid bait 42 is then accessible to a crawling insect that enters the opening 28 in the outer wall 22 of the base 22 and the aperture 32 in the inner wall 24 of the base 22. While the ability of an insect to access liquid bait 42 in the liquid bait holding tank 30 is readily apparent, insects can also feed directly from the liquid transport device 648. Therefore, the presence of liquid bait 42 in the liquid bait holding tank 30 is not a requirement of the invention as long as an insect can access the liquid transport device 648 to feed.

Figure 7:
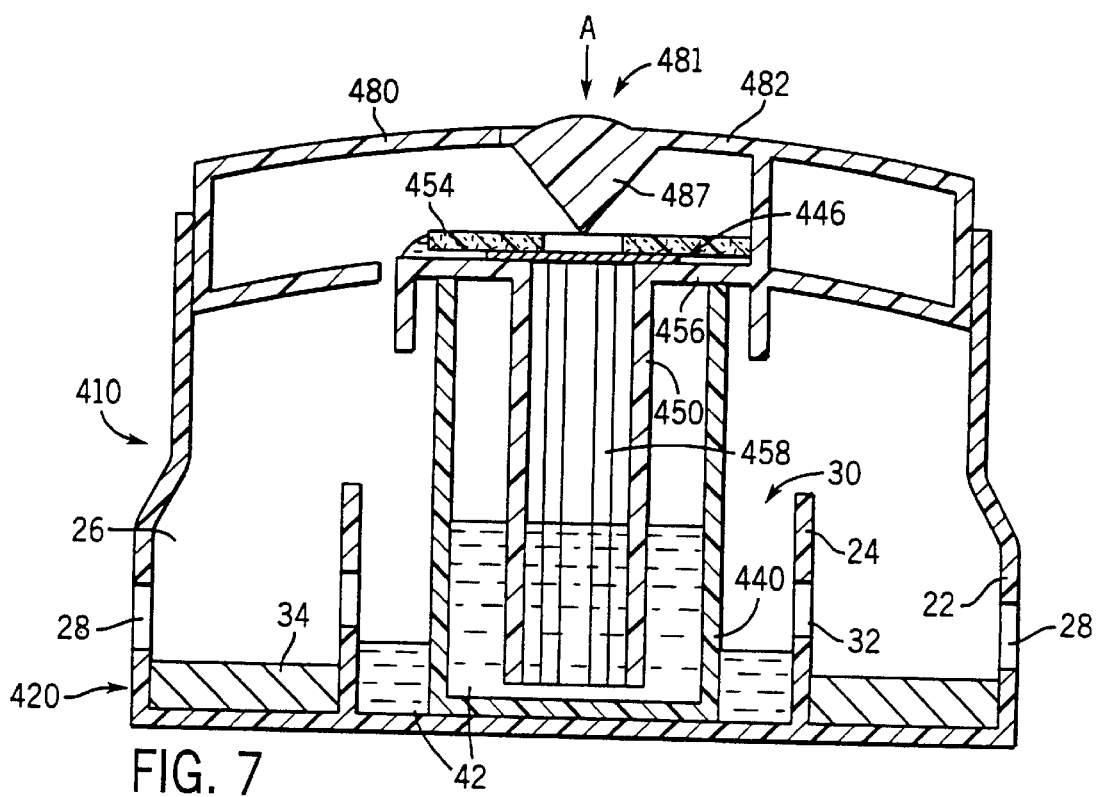
FIG. 7 is a cross sectional view, similar to FIG. 3B, of another embodiment of an insect bait station in accordance with the invention.

Turning now to FIG. 7, the inside of another embodiment of an insect bait station 410 in accordance with the invention is shown. The base 420 includes a cylindrical inner wall 24 that is inwardly spaced from the outer wall 22 so as to define a solid bait chamber 26 between the outer wall 22 and the inner wall 24. The solid bait chamber 26 contains a solid bait 34 as described above. The inner wall 24 of the base 420 also defines a liquid bait holding tank 30 in an inner region of the base 420.

Figure 7A:
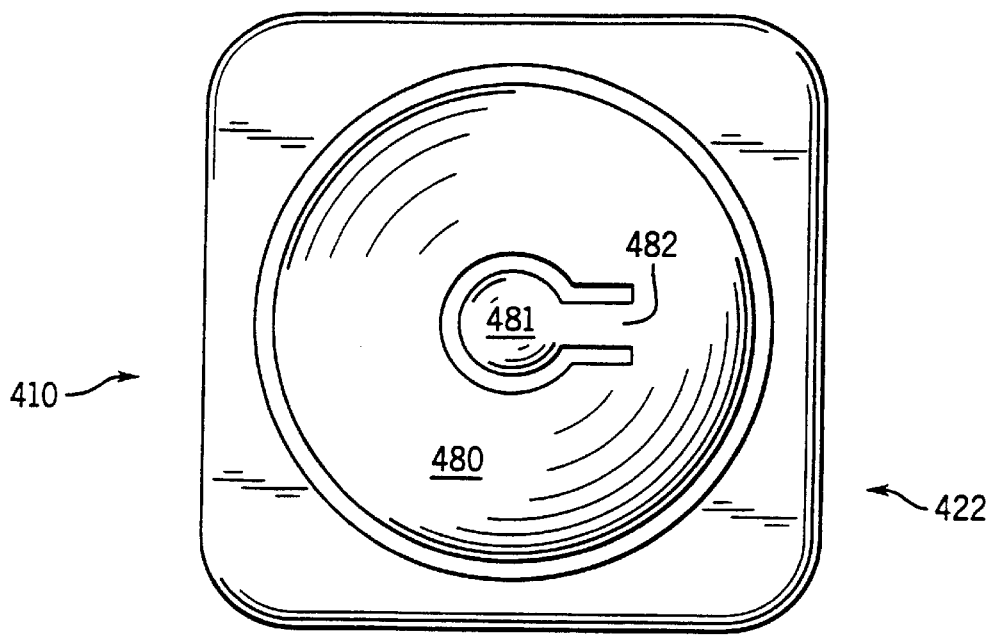
FIG. 7A is a top view of the insect bait station of FIG. 7.
Figure 7B:
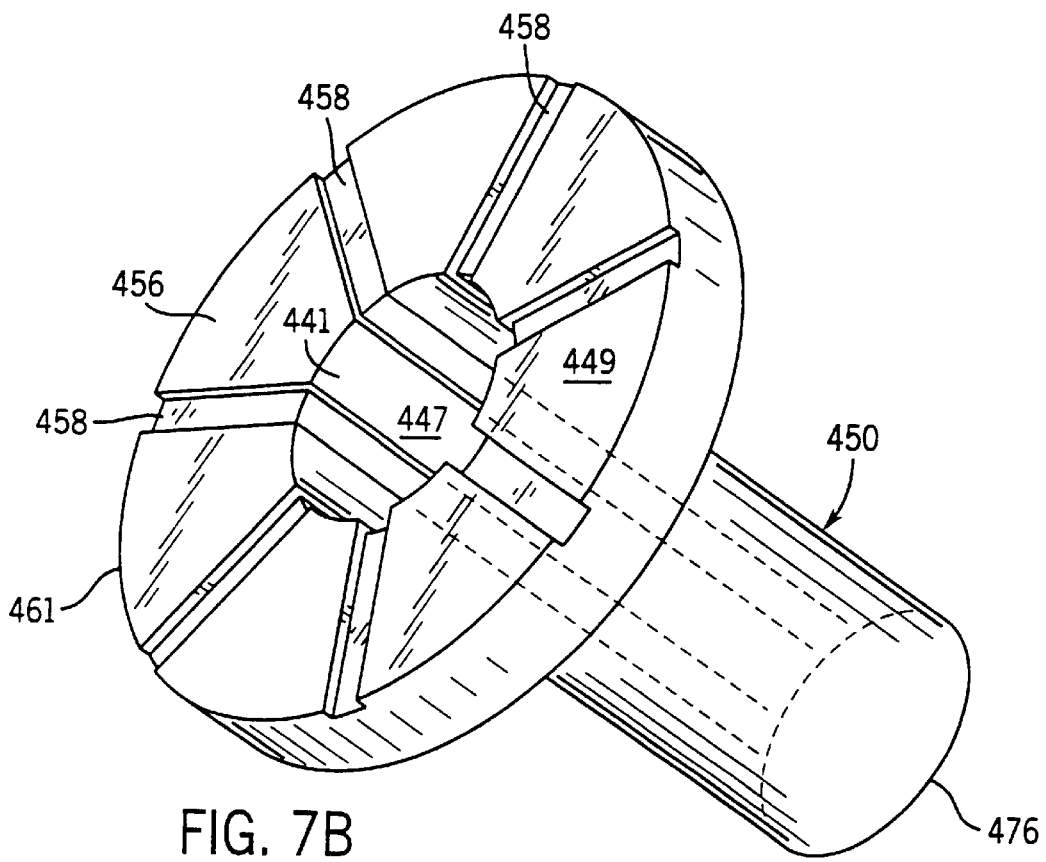
FIG. 7B is a perspective view of the reservoir cover and accompanying capillary feed tube of the insect bait station of FIG. 7.

The insect bait station 410 shown in FIG. 7 also includes a reservoir 440 for holding a liquid bait 42. The reservoir 440 extends upwardly and terminates in an open end. The open end partially sealed by a cover flange 456 that is shown in detail in FIG. 7B. The cover flange 456 has a central opening 441 and a tube 450 that extends downward from the central opening 441. The inner surface 447 of the tube 450 has capillary channels 458 formed in the inner surface 447. The capillary channels 458 also are present in the upper surface 449 of the cover flange 456. The capillary channels 458 provide a fluid path from the bottom end 476 of the tube 450 to the edge 461 of the cover flange 456. The cover flange fits over the open end of the reservoir 440 as shown in FIG. 7 such that the tube 450 extends into the liquid bait 42 in the reservoir 440. The central opening 441 of the cover flange 456 is sealed by closure 446, preferably a foil material as described above. As shown in FIG. 7, the reservoir 440 is arranged in the insect bait station 410 such that the reservoir opens upwardly and the bottom end of the reservoir 440 rests on the floor of the a liquid bait holding tank 30.

The insect bait station 410 of FIG. 7 also includes an activation member 480 that is used to release liquid bait 42 from the reservoir 440 into the liquid holding tank 30. The activation member 480 has a central section 481 having a conical projection 487 that extends downwardly from the central section 481 of the activation member 480. Looking at FIG. 7 and FIG. 7A, it can be seen that the central section 481 is attached to the activation member 480 by way of a connector strips 482.

FIG. 7 shows the insect bait station 410 with the activation member 480 in the storage position, i.e., the position that would keep the liquid bait 42 in the reservoir 440. In order to activate the insect bait station 410 so that the liquid bait 42 and the solid bait 34 are both accessible to a crawling insect, a user applies a downward force to the central section 481 of the activation member 480 in direction "A" as shown in FIG. 7. When a user applies the downward force in direction "A", the central section 481 of the activation member 480 moves downward by the way of flexing of the connector strip 482. The central section 481 of the activation member 480 continues to move downward such that conical projection 487 punctures the closure 446 above the central opening 441 of the cover flange 456 such that liquid bait 42 may exit the reservoir 440. Specifically, capillary action of the capillary channels 458 transports liquid bait 42 up from the reservoir 440, through the mouth of the reservoir and out onto the upper surface 449 of the cover flange 456. In one form of the insect bait station of FIG. 7, a porous material 454, such as a wick, is located adjacent the upper surface 449 of the cover flange 456 to assist in transporting liquid bait 42 from the upper surface 449 of the cover flange 456. Liquid bait 42 may then travel over the edge 461 of the cover flange 456 and down into the liquid holding tank 30 as shown in FIG. 7. The liquid bait 42 is then accessible to a crawling insect that enters the opening 28 in the outer wall 22 of the base 420 and the aperture 32 in the inner wall 24 of the base 420. While the ability of an insect to access liquid bait 42 in the liquid bait holding tank 30 is readily apparent, insects can also feed directly from the cover flange 456 and/or the porous material 454. Therefore, the presence of liquid bait 42 in the liquid bait holding tank 30 is not a requirement of the invention as long as an insect can access the cover flange 456 and/or the porous material 454 to feed.

Figure 8A:
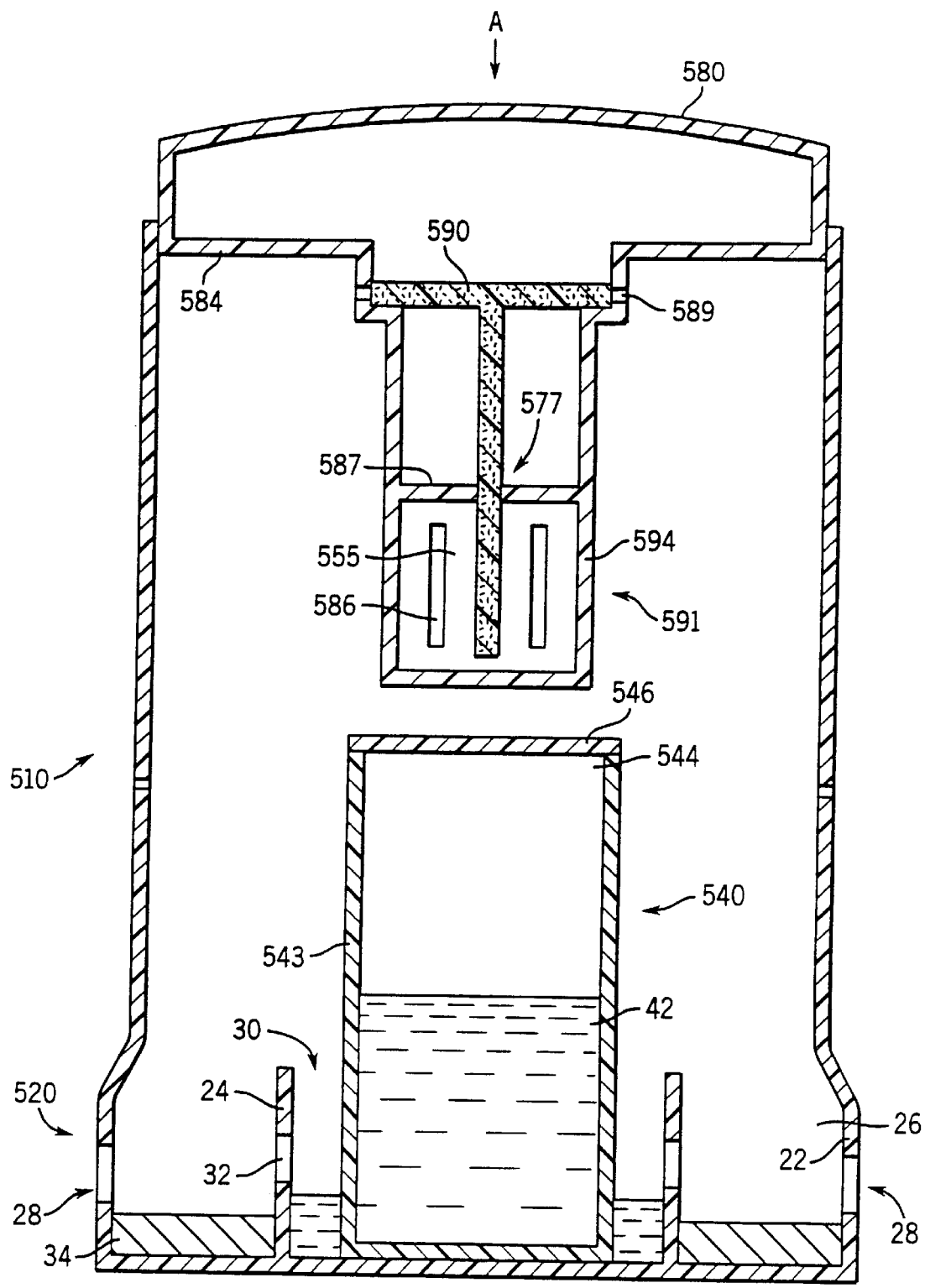
FIG. 8A is a cross sectional view, similar to FIG. 3A, of another embodiment of an insect bait station in accordance with the invention before activation of the liquid bait.
Figure 8B:
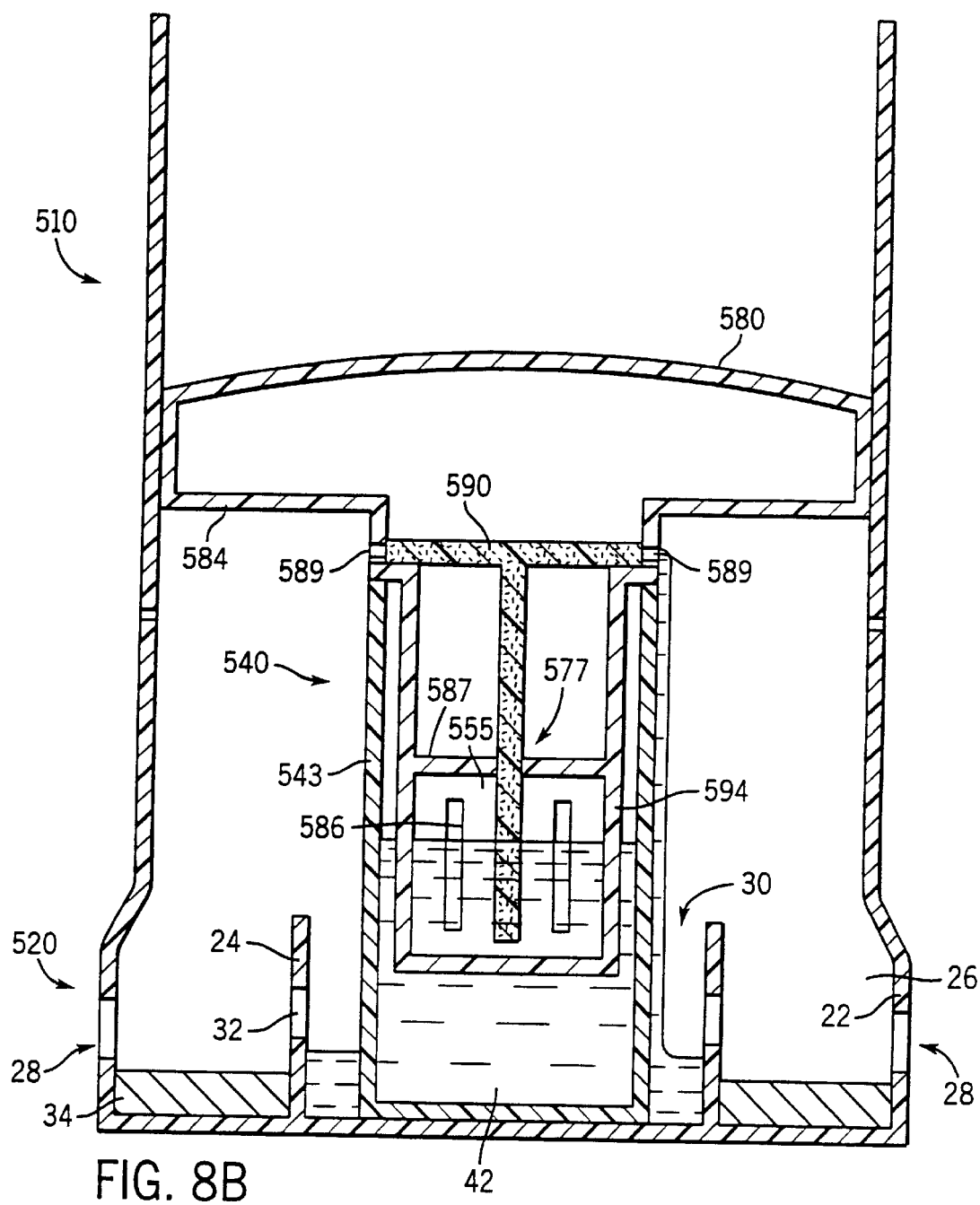
FIG. 8B is a cross sectional view, similar to FIG. 3B, of the insect bait station of FIG. 8A showing the insect bait station after activation of the liquid bait.

Referring now to FIGS. 8A and 8B, the inside of another embodiment of a bait station 510 is shown in detail. The base 520 includes a cylindrical inner wall 24 that is inwardly spaced from the outer wall 22 so as to define a solid bait chamber 26 between the outer wall 22 and the inner wall 24. The solid bait chamber 26 contains a solid bait 34. The inner wall 24 of the base 520 also defines a liquid bait holding tank 30 in an inner region of the base 520.

The insect bait station 510 shown in FIGS. 8A and 8B also includes a reservoir 540 for holding a liquid bait 42. The reservoir 540 has a body 543 that terminates in a mouth 544. The mouth 544 is sealed so as to contain the liquid bait 42 in the reservoir 540 by way of a closure 546 that may be a foil material as described above. The reservoir 540 rests on and can be affixed to a floor of the liquid bait holding tank 30.

The insect bait station 510 of FIGS. 8A and 8B also includes an activation member 580 that is used to release liquid bait 42 from the reservoir 540 into the liquid holding tank 30. The activation member 580 has a cylindrical tube 591 that extends downwardly from an underside 584 of the activation member 580. A liquid transport device 590, preferably a porous material such as a wick, is contained within the tube 591. The tube 591 also has an outer wall 594 with holes 586 such that liquid bait 42 may flow through each hole 586 when the liquid bait 42 is activated as described below. The tube 591 also has a transverse wall 587 extending laterally inward from an inner surface 555 of the tube 591. The transverse wall 587 defines an upper section and a lower section of the tube 591. The porous material 590 extends from the upper section to the lower section of the tube through a passage 577 in the transverse wall 587.

FIG. 8A shows the insect bait station 510 with the activation member 580 in the storage position, i.e., the position that would keep the liquid bait 42 in the reservoir 540. In order to activate the insect bait station 510 so that the liquid bait 42 and the solid bait 34 are both accessible to a crawling insect, a user applies a downward force to-the activation member 580 in direction "A" as shown in FIG. 8A. When a user applies the downward force in direction "A", the activation member 580 moves downward such that tube 591 punctures the closure 546 of the reservoir 540 and enters the reservoir 540 as shown in FIG. 8B. Liquid bait 42 can then flow into the inner regions of the tube 591. The porous material 590 in the tube 591 transports the liquid bait 42 upward from the tube 591 of the reservoir 540 by capillary or wicking action through the passage 577 in the transverse wall 587 and out of the mouth 544 of the reservoir 540 by way of holes 589 in the tube 591 as shown in FIG. 8B. The liquid bait 42 travels down the sides of reservoir 540 and into the liquid holding tank 30 as shown in FIG. 8B. The liquid bait 42 is then accessible to a crawling insect that enters the opening 28 in the outer wall 22 of the base 520 and the aperture 32 in the inner wall 24 of the base 520. While the ability of an insect to access liquid bait 42 in the liquid bait holding tank 30 is readily apparent, insects can also feed directly from the porous material 590. Therefore, the presence of liquid bait 42 in the liquid bait holding tank 30 is not a requirement of the invention as long as an insect can access the porous material 590 to feed.

The insect bait station of FIGS. 8A and 8B is particularly advantageous as it will not leak liquid bait from the reservoir 540 upon tipping over even after the liquid bait enters the liquid bait holding tank 30. Looking at FIG. 8B, it can be seen that the reservoir is sealed by the tube 591 after activation. If the insect bait station 510 were to tip over, the porous material 590 and the transverse wall 587 of the tube 591 would block passage of liquid bait from the reservoir 540.

Figure 9:
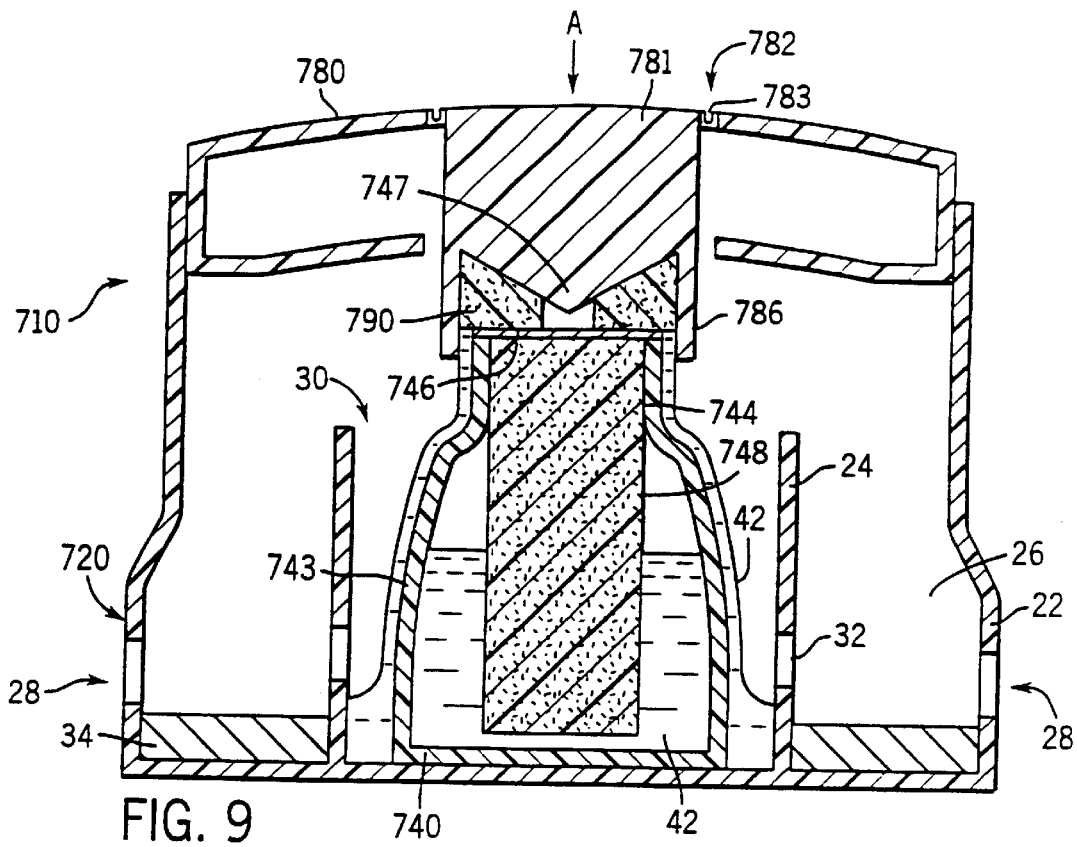
FIG. 9 is a cross sectional view, similar to FIG. 3B, of another embodiment of an insect bait station in accordance with the invention.

Turning now to FIG. 9, the inside of another embodiment of an insect bait station 710 in accordance with the invention is shown. The base 720 includes a cylindrical inner wall 24 that is inwardly spaced from the outer wall 22 so as to define a solid bait chamber 26 between the outer wall 22 and the inner wall 24. The solid bait chamber 26 contains a solid bait 34 as described above. The inner wall 24 of the base 720 also defines a liquid bait holding tank 30 in an inner region of the base 720.

The insect bait station 710 shown in FIG. 9 also includes a reservoir 740 for holding a liquid bait 42. The reservoir 740 has a body 743 with sloping sides that extend upward and terminate in a mouth 744. The mouth 744 is sealed so as to contain the liquid bait 42 in the reservoir 740 by way of a closure 746, preferably a foil material as described above. As shown in FIG. 9, the reservoir 740 is arranged in the insect bait station 710 such that the mouth 744 opens upwardly and the bottom end of the reservoir 740 rests on the floor of the a liquid bait holding tank 30. The reservoir 740 also includes a liquid transport device 748 that may be a capillary member or other porous material such as a wick. The liquid transport device 748 is positioned in the mouth 744 of the reservoir 740.

Figure 11A:
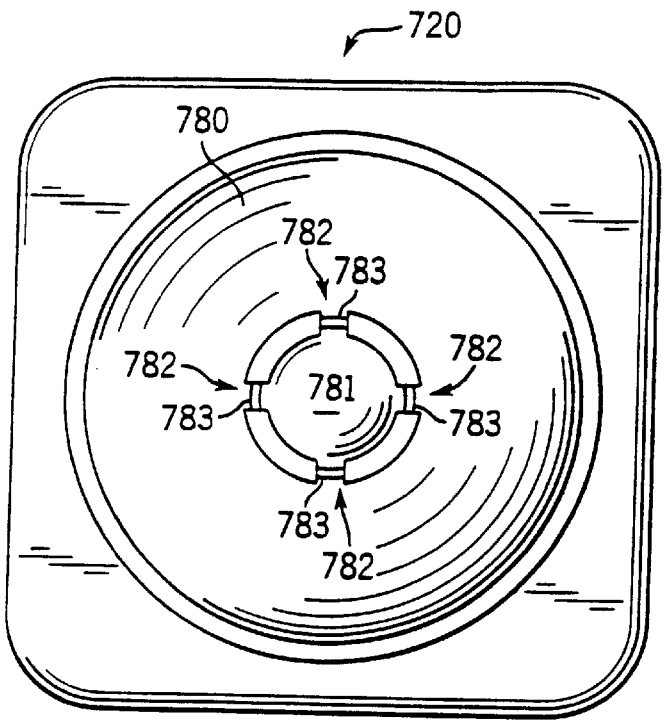
FIG. 11A is a top view of the insect bait station of FIG. 9.

The insect bait station 710 of FIG. 9 also includes an activation member 780 that is used to release liquid bait 42 from the reservoir 740 into the liquid holding tank 30. The activation member 780 has a central section 781 having a conical projection 747 that extends downwardly from the central section 781 of the activation member 280. A liquid transport device 790, such a capillary member or other porous material such as a wick, surrounds the projection 747. A cylindrical wall 786 also extends downwardly from the central section 781 of the activation member 780 and surrounds the liquid transport device 790. Looking at FIG. 9 and FIG. 11A, it can be seen that the central section 781 is attached to the activation member 780 by way of connector strips 782, which have an area of reduced thickness 783 in their upper surface.

FIG. 9 shows the insect bait station 710 with the activation member 780 in the storage position, i.e., the position that would keep the liquid bait 42 in the reservoir 740. In order to activate the insect bait station 710 so that the liquid bait 42 and the solid bait 34 are both accessible to a crawling insect, a user applies a downward force to the activation member 780 in direction "A" as shown in FIG. 9 When a user applies the downward force in direction "A", the central section 781 of the activation member 780 moves downward such that the connector strips 782 fracture at their respective areas of reduced thickness 783 in the upper surface. The central section 781 of the activation member 780 continues to move downward such that conical projection 747 punctures the closure 746 of the reservoir 740 such that liquid bait 42 may exit the reservoir 740. The liquid transport device 748 transports the liquid bait 42 upward from the body 743 of the reservoir 740 by capillary or wicking action through the mouth 744 of the reservoir 740. The liquid transport device 790, which is in fluid communication with the liquid transport device 748, then transports the liquid bait 42 from the liquid transport device 748 such that the liquid bait 42 travels down the sloping sides of reservoir 740 and into the liquid holding tank 30 as shown in FIG. 9. The liquid bait 42 is then accessible to a crawling insect that enters the opening 28 in the outer wall 22 of the base 22 and the aperture 32 in the inner wall 24 of the base 22. While the ability of an insect to access liquid bait 42 in the liquid bait holding tank 30 is readily apparent, insects can also feed directly from the liquid transport device 748 and/or liquid transport device 790. Therefore, the presence of liquid bait 42 in the liquid bait holding tank 30 is not a requirement of the invention as long as an insect can access the liquid transport device 748 and/or liquid transport device 790 to feed.

Figure 10:
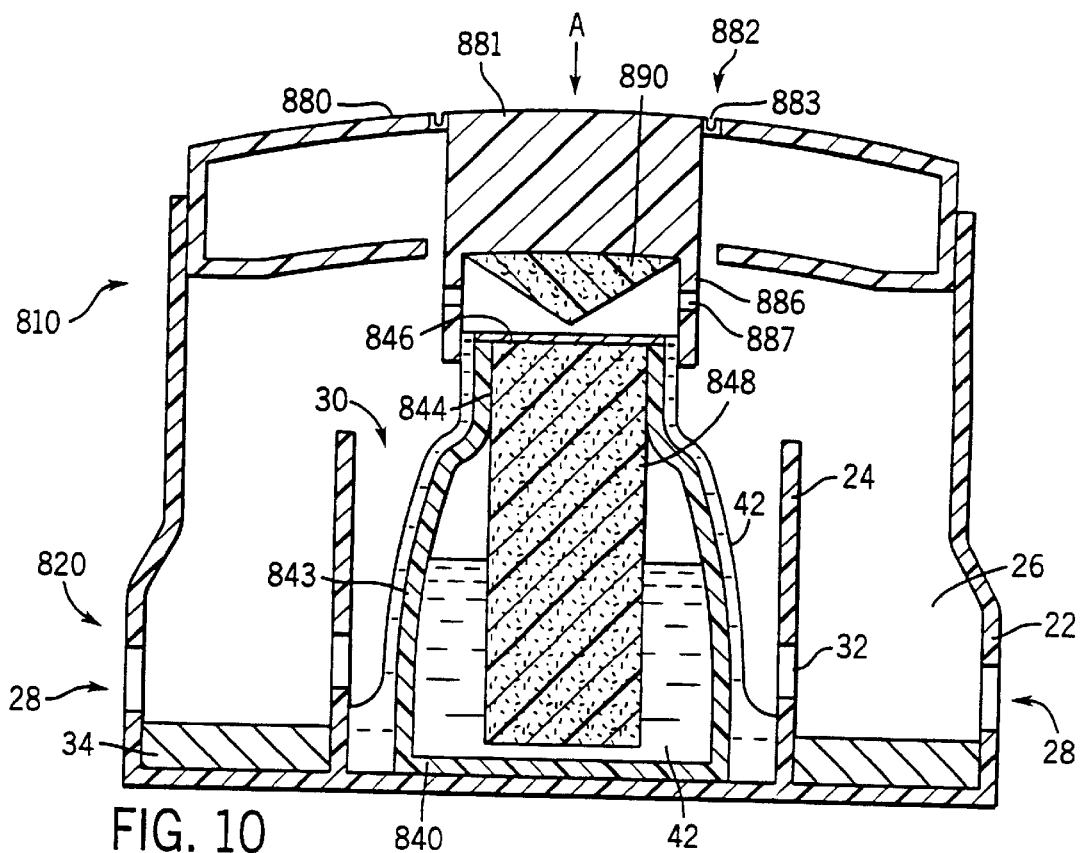
FIG. 10 is a cross sectional view, similar to FIG. 3B, of yet another embodiment of an insect bait station in accordance with the invention.

Referring now to FIG. 10, the inside of yet another embodiment of an insect bait station 810 in accordance with the invention is shown. The base 820 includes a cylindrical inner wall 24 that is inwardly spaced from the outer wall 22 so as to define a solid bait chamber 26 between the outer wall 22 and the inner wall 24. The solid bait chamber 26 contains a solid bait 34 as described above. The inner wall 24 of the base 820 also defines a liquid bait holding tank 30 in an inner region of the base 820.

The insect bait station 810 shown in FIG. 10 also includes a reservoir 840 for holding a liquid bait 42. The reservoir 840 has a body 843 with sloping sides that extend upward and terminate in a mouth 844. The mouth 844 is sealed so as to contain the liquid bait 42 in the reservoir 840 by way of a closure 846, preferably a foil material as described above. As shown in FIG. 10, the reservoir 840 is arranged in the insect bait station 810 such that the mouth 844 opens upwardly and the bottom end of the reservoir 840 rests on the floor of the liquid bait holding tank 30. The reservoir 840 also includes a liquid transport device 848 that may be a capillary member or other porous material such as a wick. The liquid transport device 848 is positioned in the mouth 844 of the reservoir 840.

Figure 11B:
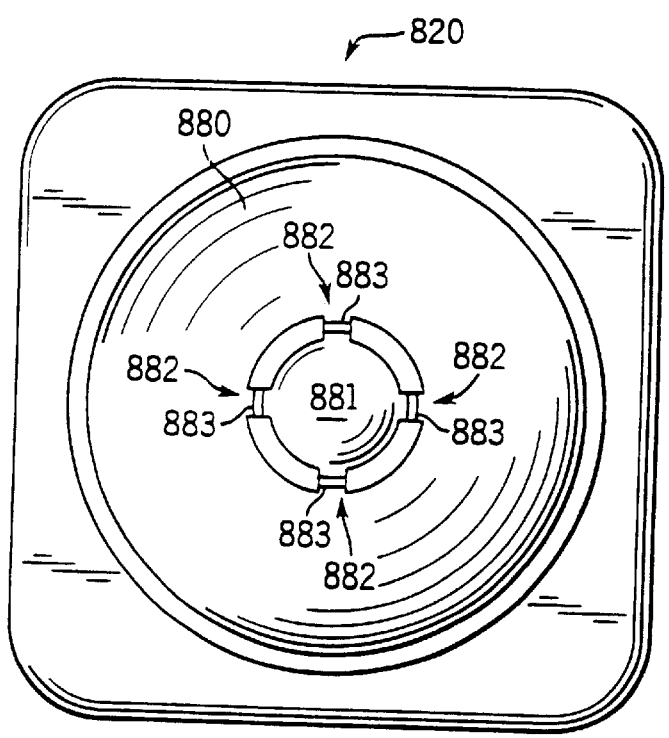
FIG. 11B is a top view of the insect bait station of FIG. 10.

The insect bait station 810 of FIG. 10 also includes an activation member 880 that is used to release liquid bait 42 from the reservoir 840 into the liquid holding tank 30. The activation member 880 has a central section 881 having a liquid transport device 890, such a capillary member or other porous material such as a wick, that extends downwardly from the central section 881 of the activation member 880. A cylindrical wall 886 also extends downwardly from the central section 881 of the activation member 880 and surrounds the liquid transport device 890. Looking at FIG. 10 and FIG. 11B, it can be seen that the central section 881 is attached to the activation member 880 by way of connector strips 882, which have an area of reduced thickness 883 in their upper surface.

FIG. 10 shows the insect bait station 810 with the activation member 880 in the storage position, i.e., the position that would keep the liquid bait 42 in the reservoir 840. In order to activate the insect bait station 810 so that the liquid bait 42 and the solid bait 34 are both accessible to a crawling insect, a user applies a downward force to the central section 881 of the activation member 880 in direction "A" as shown in FIG. 10. When a user applies the downward force in direction "A", the central section 881 of the activation member 880 moves downward such that the connector strips 882 fracture at their respective areas of reduced thickness 883 in the upper surface. The central section 881 of the activation member 880 continues to move downward such that liquid transport device 890 punctures the closure 846 of the reservoir 840 such that liquid bait 42 may exit the reservoir 840. The liquid transport device 848 transports the liquid bait 42 upward from the body 843 of the reservoir 840 by capillary or wicking action through the mouth 844 of the reservoir 840. The liquid transport device 890, which is in fluid communication with the liquid transport device 848, then transports the liquid bait 42 from the liquid transport device 848 such that the liquid bait 42 travels down the sloping sides of reservoir 840 and into the liquid holding tank 30 as shown in FIG. 10. Liquid bait 42 may also travel through openings 887 of the cylindrical wall 886 of the activation member 880 and down the sloping sides of reservoir 840 and into the liquid holding tank 30. The liquid bait 42 is then accessible to a crawling insect that enters the opening 28 in the outer wall 22 of the base 22 and the aperture 32 in the inner wall 24 of the base 22. While the ability of an insect to access liquid bait 42 in the liquid bait holding tank 30 is readily apparent, insects can also feed directly from the liquid transport device 848 and/or liquid transport device 890. Therefore, the presence of liquid bait 42 in the liquid bait holding tank 30 is not a requirement of the invention as long as an insect can access the liquid transport device 848 and/or liquid transport device 890 to feed.

Thus, an insect bait station for controlling crawling insects, such as cockroaches has been provided. Cockroaches are attracted to the insect bait station to find a dark harborage and to seek the moisture offered by the liquid bait. They enter through access openings in the insect bait station and reach areas which contain solid or liquid bait. They then feed upon the bait-toxicant solids and/or liquids, which may preferably contain delayed action insecticide, return to their usual hiding places within walls or behind cabinets and die. The dead roaches, which are now toxic, will then be cannibalized by other roaches, extending the kill action of the station to roaches which have not contacted the station directly.

Other modifications of the bait station and method of the present invention will become apparent to those skilled in the art from an examination of the above patent specification and drawings. Therefore, other variations of the present invention may be made which fall within the scope of the following claims even though such variations were not specifically discussed above.

Industrial Applicability

The invention provides an insecticidal bait station.

What is claimed is:

1. An insect bait station, comprising:
    a reservoir for holding a liquid bait, the reservoir having a mouth and a closure for sealing the mouth such that the liquid bait is contained in the reservoir;
    a liquid wicking device positioned in the mouth of the reservoir to transport the liquid bait from the reservoir and through the mouth of the reservoir;
    a piercer for opening the closure of the reservoir such that the transport of the liquid bait may occur;
    an activation member for moving the piercer into contact with the closure of the reservoir to open the closure; and
    a base defining a solid bait chamber containing a solid bait, the base including an upwardly extending outer wall and an upwardly extending inner wall, the inner wall being inwardly spaced from the outer wall so as to define the solid bait chamber between the outer wall and the inner wall, the outer wall having an opening to provide access to the solid bait chamber, the inner wall also defining a liquid bait holding tank in an inner region of the base,
    wherein the reservoir is positioned such that the liquid bait can be fed by the wicking device into the liquid bait holding tank once the closure is opened, and
    wherein the station also comprises an insecticide.

2. An insect bait station according to claim 1 wherein:
    the reservoir is positioned such that the mouth of the reservoir opens downwardly, and a downward force applied to the activation member brings the closure of the reservoir into contact with the piercer to open the closure.

3. An insect bait station according to claim 1 wherein:

the liquid wicking device comprises a porous material positioned in the mouth of the reservoir.

4. An insect bait station according to claim 1 wherein:

the reservoir is positioned such that the mouth of the reservoir opens upwardly, and the piercer comprises a downwardly extending projection located on an underside of the activation member.

5. An insect bait station according to claim 1 wherein:

the piercer comprises a downwardly extending blade located on the underside of the activation member such that a downward force applied to the activation member brings the blade into contact with the closure of the reservoir to open the closure.

6. An insect bait station according to claim 1 wherein:

the liquid wicking device comprises a tube having an inner surface with capillary channels, the tube extending from the mouth of the reservoir into the liquid bait, the capillary channels controllably transporting liquid bait from the reservoir up through the mouth of the reservoir.

7. An insect bait station according to claim 1 wherein:

at least a portion of the reservoir is located within the liquid bait holding tank.

8. A method of controlling crawling insects, comprising:

providing a bait station in accordance with claim 1; and locating the bait station where accessible to the insects.

* * * * *